US012632185B2

(12) United States Patent　　　(10) Patent No.: US 12,632,185 B2

Gupta et al.　　　(45) Date of Patent: May 19, 2026

(54) AUTOMATED SSD RECOVERY

(71) Applicant: Google LLC, Mountain View, CA (US)

(72) Inventors: Diwakar Gupta, Seattle, WA (US); Connor Owen McCoy, Seattle, WA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/173,853

(22) Filed: Feb. 24, 2023

(65) Prior Publication Data

US 2024/0289027 A1　　Aug. 29, 2024

(51) Int. Cl.
G06F 3/06 (2006.01)

(52) U.S. Cl.
CPC .......... G06F 3/0619 (2013.01); G06F 3/0653 (2013.01); G06F 3/0659 (2013.01); G06F 3/0679 (2013.01)

(58) Field of Classification Search
CPC .... G06F 3/0619; G06F 3/0653; G06F 3/0659; G06F 3/067
See application file for complete search history.

(56) References Cited

U.S. PATENT DOCUMENTS

| | | | | |
|---|---|---|---|---|
| 8,819,369 | B1 * | 8/2014 | Alappat | G06F 11/1484 |
| | | | | 718/1 |
| 9,026,500 | B1 * | 5/2015 | vonThenen | G06F 11/1469 |
| | | | | 707/679 |
| 9,934,099 | B1 * | 4/2018 | Sharma | G06F 11/1458 |
| 10,055,245 | B1 * | 8/2018 | Gupta | G06F 9/45558 |
| 10,133,508 | B1 * | 11/2018 | Smaldone | G06F 11/1461 |
| 10,481,805 | B1 | 11/2019 | Sahin et al. | |
| 10,747,872 | B1 * | 8/2020 | Ha | G06F 21/54 |
| 11,093,333 | B1 | 8/2021 | Zlotnick et al. | |
| 11,354,150 | B1 | 6/2022 | Guo et al. | |
| 2007/0244938 | A1 * | 10/2007 | Michael | G06F 16/128 |
| 2010/0082961 | A1 * | 4/2010 | Gurumoorthy | G06F 21/73 |
| | | | | 726/34 |
| 2012/0084262 | A1 * | 4/2012 | Dwarampudi | G06F 9/445 |
| | | | | 711/E12.001 |
| 2016/0154664 | A1 | 6/2016 | Iwamatsu | |
| 2019/0286475 | A1 | 9/2019 | Mani | |
| 2020/0042397 | A1 * | 2/2020 | Yu | G06F 11/1464 |
| 2022/0129292 | A1 * | 4/2022 | Tsirkin | G06F 11/2017 |
| 2022/0237310 | A1 * | 7/2022 | Kulkarni | G06F 21/6218 |
| 2022/0318103 | A1 | 10/2022 | Pandey et al. | |
| 2022/0350591 | A1 | 11/2022 | Bafna et al. | |

OTHER PUBLICATIONS

International Search Report and Written Opinion for International Application No. PCT/US2024/012912 dated Aug. 12, 2024. 17 pages.
Invitation to Pay Additional Fees for International Application No. PCT/US2024/012912 dated Jun. 20, 2024. 9 pages.

* cited by examiner

*Primary Examiner* — Kalpit Parikh

(74) *Attorney, Agent, or Firm* — Lerner David LLP

(57)　　　ABSTRACT

Aspects of the disclosure are directed to providing users more control over SSD storage recovery, such as providing capabilities and configuration options for a cloud platform to manage the SSD recovery. Aspects of the disclosure can include providing a restart-in-place maintenance mode, a configurable time-out option for SSD recovery, automatic snapshot triggering, automatic archiving, and/or extending stop/start virtual machine functionality to work with local SSD storage.

17 Claims, 6 Drawing Sheets

300

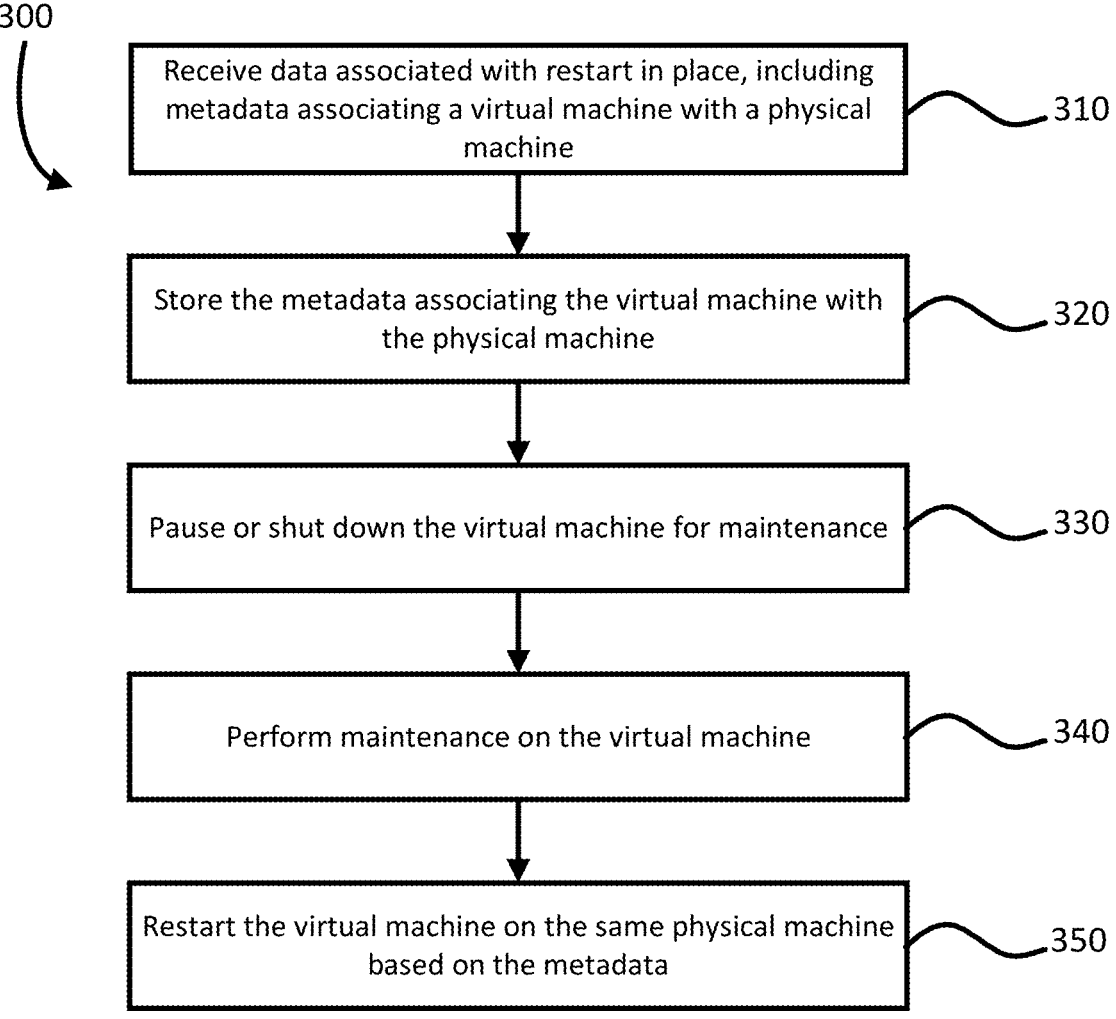

Receive data associated with restart in place, including metadata associating a virtual machine with a physical machine —310

Store the metadata associating the virtual machine with the physical machine —320

Pause or shut down the virtual machine for maintenance —330

Perform maintenance on the virtual machine —340

Restart the virtual machine on the same physical machine based on the metadata —350

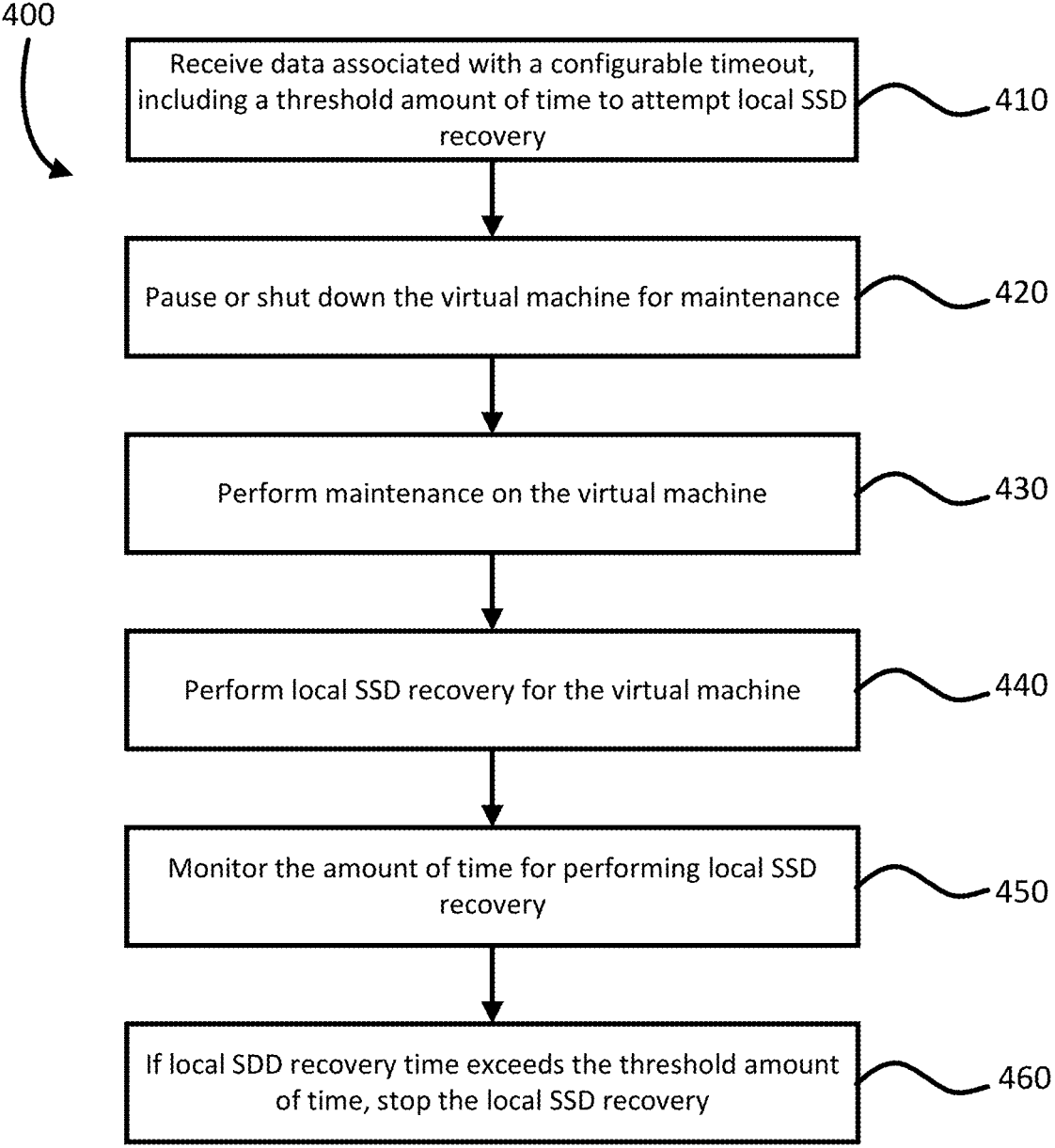

Receive data associated with a configurable timeout, including a threshold amount of time to attempt local SSD recovery — 410

Pause or shut down the virtual machine for maintenance — 420

Perform maintenance on the virtual machine — 430

Perform local SSD recovery for the virtual machine — 440

Monitor the amount of time for performing local SSD recovery — 450

If local SDD recovery time exceeds the threshold amount of time, stop the local SSD recovery — 460

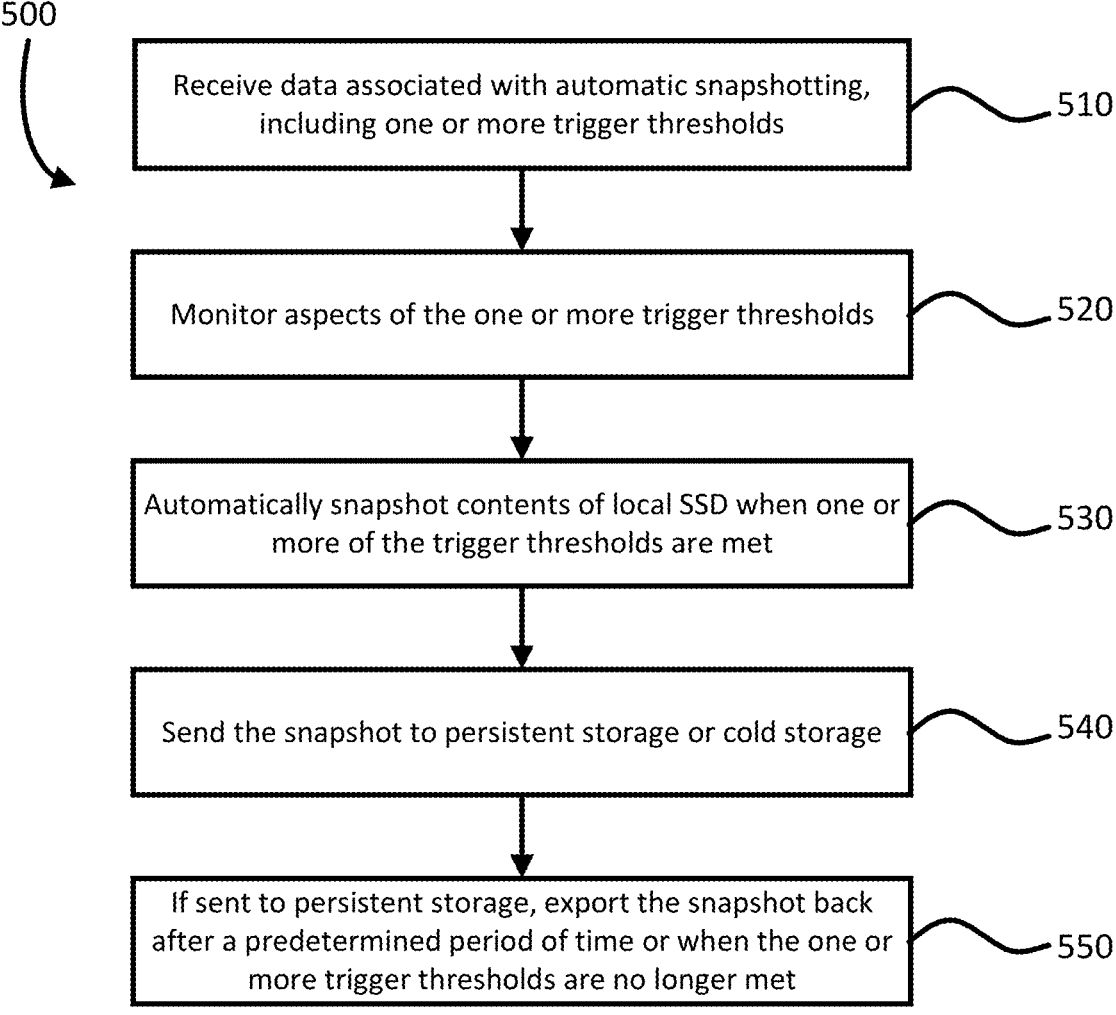

Receive data associated with automatic snapshotting, including one or more trigger thresholds ⟋⟍ 510

Monitor aspects of the one or more trigger thresholds ⟋⟍ 520

Automatically snapshot contents of local SSD when one or more of the trigger thresholds are met ⟋⟍ 530

Send the snapshot to persistent storage or cold storage ⟋⟍ 540

If sent to persistent storage, export the snapshot back after a predetermined period of time or when the one or more trigger thresholds are no longer met ⟋⟍ 550

FIG. 5

AUTOMATED SSD RECOVERY

BACKGROUND

Cloud platforms can provide users with virtual machines that can access local solid state drive (SSD) storage. Local SSDs can have low cost and latency for workloads like databases. However, data stored on local SSDs are generally not replicated, so user data can be impacted by hardware failure, user-initiated instance termination, and/or maintenance. A single physical machine can be a single point of failure by itself, and at the large scale of cloud platforms with millions of physical servers, a large number of single host failures can occur. Techniques such as live migration can help minimize impact from hardware failure or maintenance if the problem can be detected early enough to migrate the virtual machine and SSD storage to a different machine. However, this is not always possible, as physical machines can crash unexpectedly, potentially losing data stored on the SSD.

BRIEF SUMMARY

Aspects of the disclosure are directed to providing users more control over SSD storage recovery, such as providing capabilities and configuration options for a cloud platform to manage the SSD recovery. Aspects of the disclosure can include providing a restart-in-place maintenance mode, a configurable time-out option for SSD recovery, automatic snapshot triggering, automatic archiving, and/or extending stop/start virtual machine functionality to work with local SSD storage.

An aspect of the disclosure provides for a method for controlling recovery of local solid state drive (SSD) storage including: storing, by one or more processors, metadata indicating a physical machine that is hosting a virtual machine, the physical machine including local SSD storage; pausing or shutting down, by the one or more processors, the virtual machine for maintenance; and restarting, by the one or more processors, the virtual machine on the physical machine based on the metadata after maintenance is performed.

In an example, the method further includes preserving, by the one or more processors, contents of the virtual machine on the local SSD storage based on restarting the virtual machine on the physical machine. In another example, the method further includes performing, by the one or more processors, the maintenance on the virtual machine. In yet another example, restarting the virtual machine on the physical machine based on the metadata further includes matching an identifier of the SSD storage of the physical machine with an instance identifier of the virtual machine.

In yet another example, the method further includes: monitoring, by the one or more processors, an amount of time for a recovery process attempting to recover the local SSD storage; determining, by the one or more processors, the amount of time has exceeded a predetermined maximum amount of time for attempting to recover the local SSD storage; and sending, by the one or more processors, instructions to stop the recovery process.

In yet another example, the method further includes: monitoring, by the one or more processors, impact on the virtual machine with respect to one or more trigger thresholds; determining, by the one or more processors, one or more of the trigger thresholds is met; snapshotting, by the one or more processors, contents of the local SSD storage to generate a snapshot; and sending, by the one or more processors, the snapshot to persistent storage. In yet another example, the one or more trigger thresholds include one or more of a speed of input or output operations slowing down below a threshold or rates for data copy, import, or export slowing down below a threshold. In yet another example, the method further includes exporting, by the one or more processors, the snapshot from the persistent storage to the local SSD storage or a different local SSD storage.

In yet another example, the method further includes: monitoring, by the one or more processors, impact on the virtual machine with respect to one or more trigger thresholds; determining, by the one or more processors, one or more of the trigger thresholds is met; snapshotting, by the one or more processors, contents of the local SSD storage to generate a snapshot; and archiving, by the one or more processors, the snapshot to cold storage.

Another aspect of the disclosure provides for a system including: one or more processors; and one or more storage devices coupled to the one or more processors and storing instructions that, when executed by the one or more processors, cause the one or more processors to perform operations for controlling recovery of local solid state drive (SSD) storage. The operations include: storing metadata indicating a physical machine that is hosting a virtual machine, the physical machine including local SSD storage; pausing or shutting down the virtual machine for maintenance; and restarting the virtual machine on the physical machine based on the metadata after maintenance is performed.

In an example, restarting the virtual machine on the physical machine based on the metadata further includes matching an identifier of the SSD storage of the physical machine with an identifier of the virtual machine.

In another example, the operations further include: monitoring an amount of time for a recovery process attempting to recover the local SSD storage; determining the amount of time has exceeded a predetermined maximum amount of time for attempting to recover the local SSD storage; and sending instructions to stop the recovery process.

In yet another example, the operations further include: monitoring impact on the virtual machine with respect to one or more trigger thresholds; determining one or more of the trigger thresholds is met; snapshotting contents of the local SSD storage to generate a snapshot; and sending the snapshot to persistent storage. In yet another example, the operations further include exporting the snapshot from the persistent storage to the local SSD storage or a different local SSD storage.

In yet another example, the operations further include: monitoring impact on the virtual machine with respect to one or more trigger thresholds; determining one or more of the trigger thresholds is met; snapshotting contents of the local SSD storage to generate a snapshot; and archiving the snapshot to cold storage.

Yet another aspect of the disclosure provides for a non-transitory computer readable medium for storing instructions that, when executed by one or more processors, cause the one or more processors to perform operations for controlling recovery of local solid state drive (SSD) storage. The operations include: storing metadata indicating a physical machine that is hosting a virtual machine, the physical machine including local SSD storage; pausing or shutting down the virtual machine for maintenance; and restarting the virtual machine on the physical machine based on the metadata after maintenance is performed.

In an example, restarting the virtual machine on the physical machine based on the metadata further includes matching an identifier of the SSD storage of the physical machine with an identifier of the virtual machine.

In another example, the operations further include: monitoring an amount of time for a recovery process attempting to recover the local SSD storage; determining the amount of time has exceeded a predetermined maximum amount of time for attempting to recover the local SSD storage; and sending instructions to stop the recovery process.

In yet another example, the operations further include: monitoring impact on the virtual machine with respect to one or more trigger thresholds; determining one or more of the trigger thresholds is met; snapshotting contents of the local SSD storage to generate a snapshot; sending the snapshot to persistent storage; and exporting back the snapshot to the local SSD storage or a different local SSD storage.

In yet another example, the operations further include: monitoring impact on the virtual machine with respect to one or more trigger thresholds; determining one or more of the trigger thresholds is met; snapshotting contents of the local SSD storage to generate a snapshot; and archiving the snapshot to cold storage.

BRIEF DESCRIPTION OF THE DRAWINGS

FIG. 3 depicts a flow diagram of an example process for implementing restart in place for one or more virtual machines according to aspects of the disclosure.

FIG. 4 depicts a flow diagram of an example process for implementing a configurable SSD recovery timeout for one or more virtual machines according to aspects of the disclosure.

FIG. 5 depicts a flow diagram of an example process for implementing automatic snapshotting for contents of one or more virtual machines according to aspects of the disclosure.

DETAILED DESCRIPTION

Figure 1:
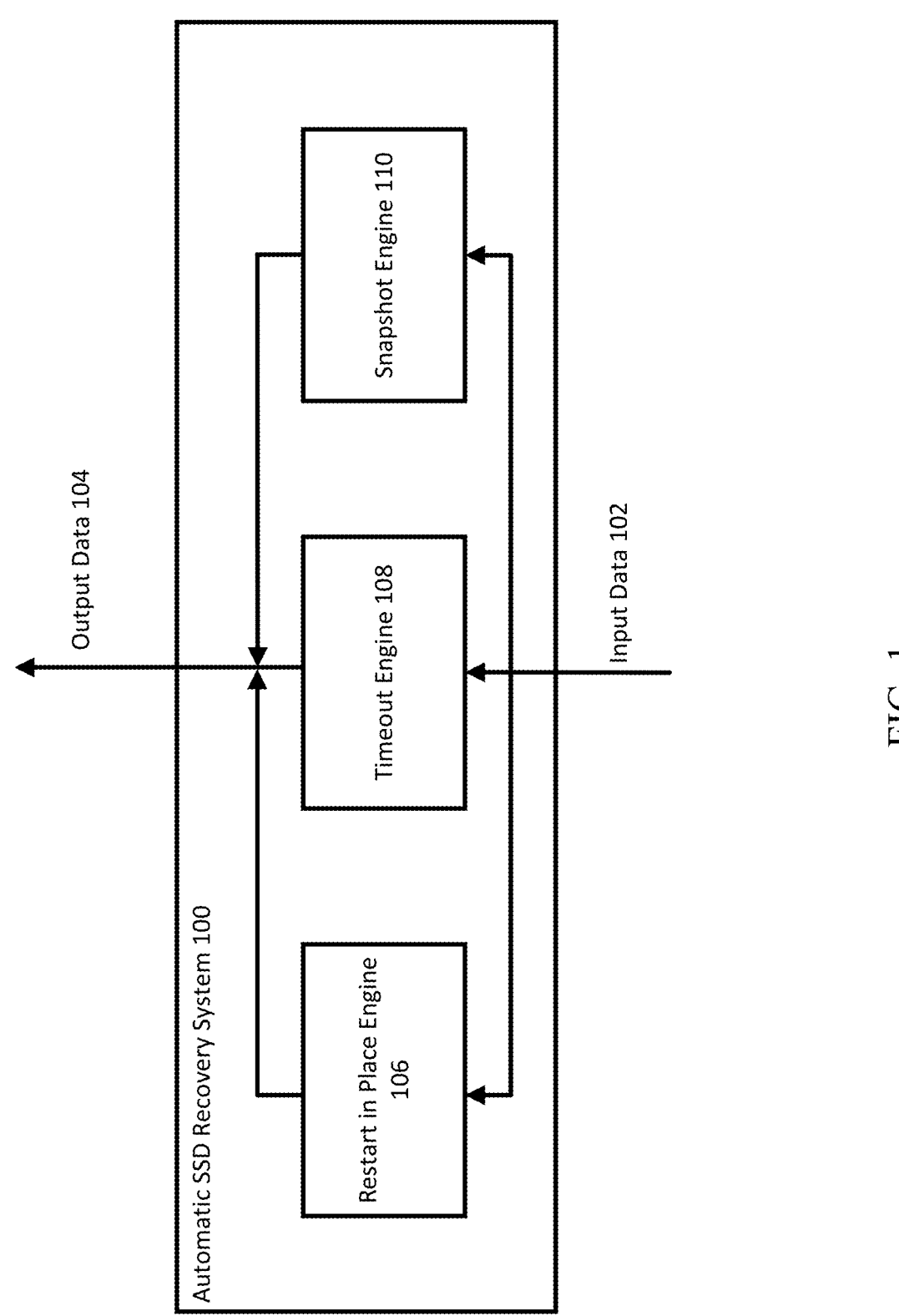
FIG. 1 depicts a block diagram of an example automatic SSD recovery system for a cloud-based platform according to aspects of the disclosure.

Generally disclosed herein are implementations for an approach to control local solid state drive (SSD) storage recovery in cloud platforms. Cloud platforms can provide virtual machines which can access local SSD storage on the physical machines that host the virtual machines. However, data stored on the local SSD may not be replicated, so the data can be impacted by hardware failure, instance termination, and/or maintenance. Therefore, the approach allows for more control over local SSD recovery as well as providing more options to handle SSD data based on planned and/or unplanned maintenance.

The approach includes providing a "restart-in-place" maintenance mode along with instance migrate/terminate options for planned maintenance. If "restart-in-place" is selected, a virtual machine can restart on the same physical machine that was hosting it prior to being restarted. The same physical machine can preserve the contents of its local SSD without data loss. Underlying virtual machine scheduling and/or fleet management systems can examine metadata to ensure that a virtual machine is pinned to a physical machine so that the virtual machine restarts on the same physical machine. The virtual machine scheduling and fleet management system can also prevent other virtual machines from being scheduled on the same physical machine to ensure the physical machine is not overbooked.

Up-front notifications and/or signals/APIs can be provided to users to control timing of maintenance and orchestrate application level fail-over, recovery, and/or rehydration. A user can be notified that a virtual machine will be scheduled to go offline for maintenance. For example, the user can be notified an amount of days in advance of the scheduled maintenance. Based on that notification, the user can choose to drain their applications. Further, a "trigger now" API can be provided to users to trigger the scheduled maintenance immediately. The user can be notified once maintenance is complete. Based on that notification, the user can rehydrate their applications as needed.

The approach further includes providing a configurable time-out to wait for local SSD recovery. The configurable time-out can apply to both planned and unplanned maintenance. A user can provide an amount of time the user is willing to wait for SSD recovery before determining the data in the local SSD is lost.

The approach also includes providing automatic snapshots for persistent storage. Persistent storage, such as a persistent data disk, can be associated with a virtual machine. Configurable thresholds associated with impact on the virtual machine can be selected to trigger the snapshots. The configurable thresholds can include application level thresholds that infrastructure for the virtual machine must meet, such as input/output operations slowing down below a threshold or transaction rates for data copy/import/export meeting a threshold. Signals that a virtual machine is about to terminate can also trigger the snapshots, such as a notification that maintenance is scheduled to occur. Once a threshold is reached or a signal is received, snapshotting contents of local SSD storage to store in persistent storage can be initiated. The snapshots of the content of the local SSD can be sent to the persistent storage. The virtual machine can continue running and serving traffic or the virtual machine can be removed from the serving pool during the snapshot process due to potential application impact. The data stored in the persistent storage can be exported back, such as by the application, to the same local SSD or a different local SSD for future virtual machines after a predetermined period of time or once the threshold at issue is no longer met.

The approach can further include archiving contents of the local SSD when a virtual machine is to be terminated. The contents of the local SSD can be copied to a cold storage when the virtual machine is to be terminated. The capacity for the terminated virtual machine may not be re-used until the archival is complete.

The approach can also include extending stop/start virtual machine functionality to work with local SSD storage. Stop/start virtual machine functionality can correspond to allowing a user to shut down an instance of a virtual machine for a period of time and then resume the instance. The local SSD storage can be preserved through the "restart in place", automatic snapshotting, and/or automatic archival described above.

FIG. 1 depicts a block diagram of an example automatic SSD recovery system 100 for a cloud-based platform. The cloud-based platform can provide for services that allow for provisioning or maintaining compute resources and/or applications, such as data centers, cloud environments, and/or container frameworks. For example, the cloud-based platform can be used as a service that provides software applications, such as accounting, word processing, inventory tracking, etc. As another example, the infrastructure of the platforms can be partitioned in the form of virtual machines or containers on which software applications are run.

The SSD recovery system 100 can be configured to receive input data 102 via a user interface. For example, the SSD recovery system 100 can receive the input data 102 as part of a call to an API exposing the SSD recovery system 100. The SSD recovery system 100 can be implemented on one or more computing devices. Input to the SSD recovery system 100 can also be provided through a storage medium, including remote storage connected to the one or more computing devices over a network, or as input through a user interface on a client computing device coupled to the SSD recovery system 100.

The input data 102 can include data associated with user selection of a restart in place mode, a configurable timeout, and/or automatic snapshotting. The data associated with user selection can indicate a user of the cloud platform would like these configurations applied to their SSD storage.

The input data 102 can further include data associated with the restart in place mode, such as metadata to ensure a virtual machine is restarted on the same physical machine that was hosting it prior to being restarted. For example, the metadata can include a selection around maintenance mode, e.g., restart in place, terminate, migrate, a time-out selection and/or length, and/or a number of SSD disks and their identifiers to ensure they are exposed as before. The metadata can also include CPU, memory, IP addresses, instance identifiers, or any other metadata associated with the virtual machine.

The input data can also include data associated with the configurable timeout, such as an amount of time to attempt local SSD recovery due to planned or unplanned maintenance. For example, the amount of time can range from 0 to multiple days. The amount of time can differ depending on whether the maintenance is planned, such as a scheduled update, or unplanned, such as a machine crash.

The input data can further include data associated with the automatic snapshotting, such as thresholds to trigger the snapshots. For example, the thresholds can include thresholds related to speed of input/output operations and/or transaction rates for data copy/import/export for the virtual machine. The data associated with automatic snapshotting can also include signals that a virtual machine is about to terminate, such as a notification for scheduled maintenance. The data associated with automatic snapshotting can further include whether the snapshot can be stored in persistent storage, such as a persistent data disk, or archived in cold storage, such as storage for less frequently used data.

From the input data 102, the SSD recovery system 100 can be configured to output one or more results related to SSD recovery, generated as output data 104. The output data 104 can include instructions associated with a restart in place mode, a configurable timeout, and/or automatic snapshotting. For example, the output data 104 can include instructions for a physical machine to host the same virtual machine if the virtual machine is restarted. As another example, the output data 104 can include instructions for how long to attempt local SSD recovery before stopping the recovery. As yet another example, the output data 104 can include instructions for when to trigger automatic snapshotting for a virtual machine and where to store the snapshot, such as in persistent storage or cold storage.

The SSD recovery system 100 can be configured to provide the output data 104 as a set of computer-readable instructions, such as one or more computer programs. The computer programs can be written in any type of programming language, and according to any programming paradigm, e.g., declarative, procedural, assembly, object-oriented, data-oriented, functional, or imperative. The computer programs can be written to perform one or more different functions and to operate within a computing environment, e.g., on a physical device, virtual machine, or across multiple devices. The computer programs can also implement functionality described herein, for example, as performed by a system, engine, module, or model.

The SSD recovery system 100 can further be configured to forward the output data 104 to one or more other devices configured for translating the output data 104 into an executable program written in a computer programming language and optionally as part of a framework for recovering SSD data. The SSD recovery system 100 can also be configured to send the output data 104 to a storage device for storage and later retrieval. The SSD recovery system 100 can further be configured to send the output data 104 for display, such as on a user display.

The SSD recovery system 100 can include a restart in place engine 106. The restart in place engine 106 can be implemented as one or more computer programs, specially configured electronic circuitry, or any combination of the preceding. The restart in place engine 106 can be configured to restart a virtual machine on the same physical machine the virtual machine was hosted on prior to restarting. The restart in place engine 106 can pause or shut down a virtual machine for planned or unplanned maintenance. Prior to being paused or shut down, the restart in place engine 106 can receive metadata for the virtual machine to indicate which physical machine is hosting the virtual machine. Once maintenance is complete, the restart in place engine 106 can restart the virtual machine on the same physical machine based on the metadata. Since the same physical machine can include local SSD storage, virtual machine contents can be preserved.

The SSD recovery system 100 can further include a timeout engine 108. The timeout engine 108 can be implemented as one or more computer programs, specially configured electronic circuitry, or any combination of the preceding. The timeout engine 108 can be configured to stop local SSD recovery for a physical machine hosting the virtual machine if a predetermined amount of time is exceeded. For example, the predetermined amount of time can range from 0, indicating to terminate the virtual machine without performing local SSD recovery, to days attempting recover data stored on the local SSD associated with the virtual machine. The timeout engine 108 can receive the predetermined amount of time. In response to planned or unplanned maintenance, local SSD recovery can be performed. The timeout engine 108 can monitor how long the local SSD recovery is occurring. If the local SSD recovery exceeds the predetermined amount of time, the timeout engine 108 can stop the local SSD recovery. The virtual machine can then be restarted on a different physical machine, which may not have access to the local SSD data of the prior physical machine. If the predetermined amount of time is 0, the timeout engine 108 can be configured to restart the virtual machine on a different physical machine without attempting local SSD recovery.

The SSD recovery system 100 can further include a snapshot engine 110. The snapshot engine 110 can be implemented as one or more computer programs, specially configured electronic circuitry, or any combination of the preceding. The snapshot engine 110 can be configured to automatically snapshot local SSD storage in response to one or more thresholds. The thresholds to trigger automatic snapshotting can be associated with impact on the virtual machine, such as application level thresholds that infrastructure for the virtual machine must meet. If one or more of the thresholds are met, the snapshot engine 110 can be configured to snapshot contents of the local SSD storage. The snapshot engine 110 can be configured to store the snapshot in persistent storage or archive the snapshot in cold storage. For snapshots stored in persistent storage, after a predetermined amount of time or if the threshold at issue is no longer being met, the snapshot engine 110 can export the snapshot back to the same local SSD or a different local SSD.

Figure 2:
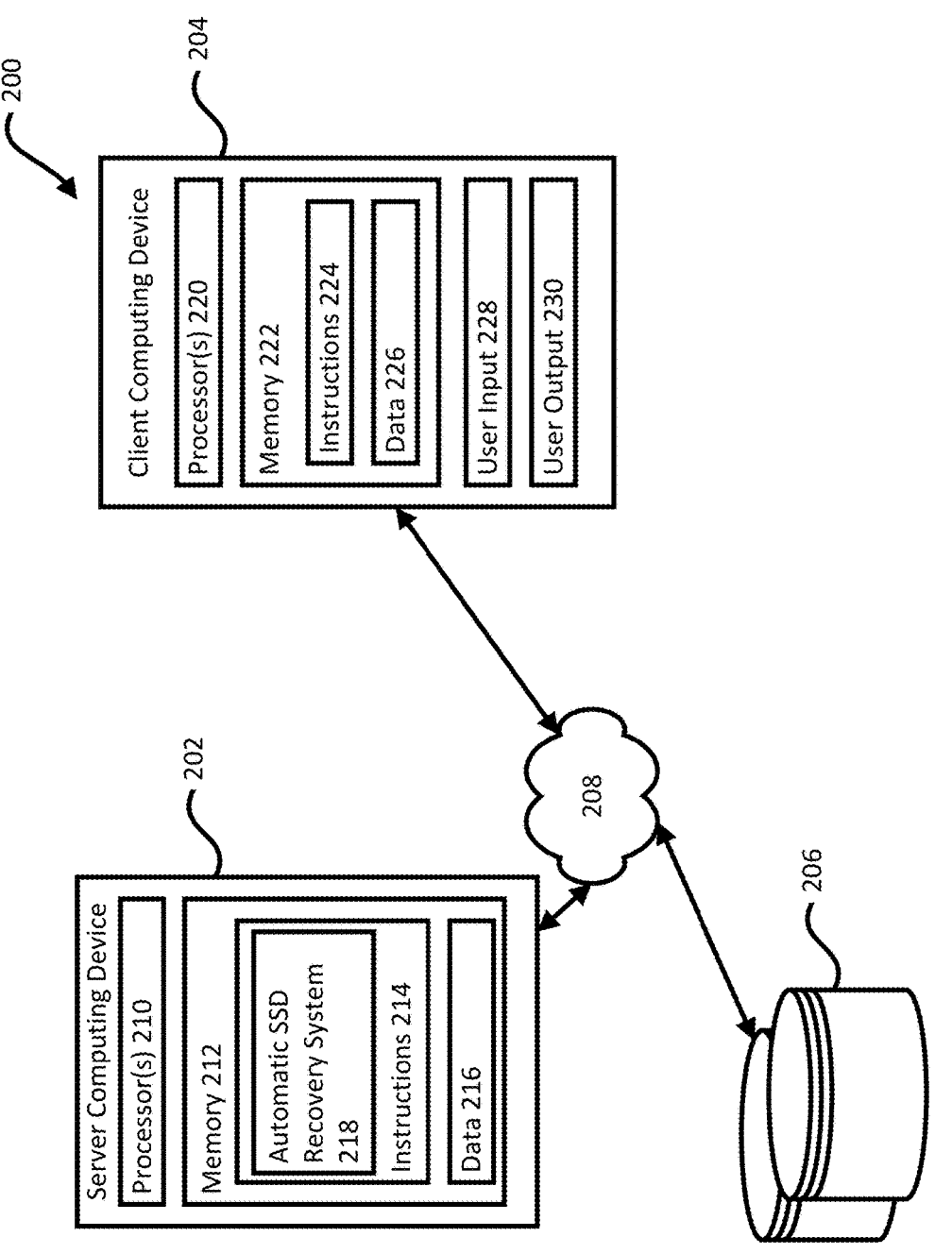
FIG. 2 depicts a block diagram of an example environment for implementing an automatic SSD recovery system according to aspects of the disclosure.

FIG. 2 depicts a block diagram of an example environment 200 for implementing an automatic SSD recovery system 218. The automatic SSD recovery system 218 can be implemented on one or more devices having one or more processors in one or more locations, such as in server computing device 202. Client computing device 204 and the server computing device 202 can be communicatively coupled to one or more storage devices 206 over a network 208. The storage devices 206 can be a combination of volatile and non-volatile memory and can be at the same or different physical locations than the computing devices 202, 204. For example, the storage devices 206 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 202 can include one or more processors 210 and memory 212. The memory 212 can store information accessible by the processors 210, including instructions 214 that can be executed by the processors 210. The memory 212 can also include data 216 that can be retrieved, manipulated, or stored by the processors 210. The memory 212 can be a type of non-transitory computer readable medium capable of storing information accessible by the processors 210, such as volatile and non-volatile memory. The processors 210 can include one or more central processing units (CPUs), graphic processing units (GPUs), field-programmable gate arrays (FPGAs), and/or application-specific integrated circuits (ASICs), such as tensor processing units (TPUs).

The instructions 214 can include one or more instructions that, when executed by the processors 210, cause the one or more processors to perform actions defined by the instructions 214. The instructions 214 can be stored in object code format for direct processing by the processors 210, or in other formats including interpretable scripts or collections of independent source code modules that are interpreted on demand or compiled in advance. The instructions 214 can include instructions for implementing an automatic SSD recovery system 218, which can correspond to the SSD recovery system 100 of FIG. 1. The automatic SSD recovery system 218 can be executed using the processors 210, and/or using other processors remotely located from the server computing device 202.

The data 216 can be retrieved, stored, or modified by the processors 210 in accordance with the instructions 214. The data 216 can be stored in computer registers, in a relational or non-relational database as a table having a plurality of different fields and records, or as JSON, YAML, proto, or XML documents. The data 216 can also be formatted in a computer-readable format such as, but not limited to, binary values, ASCII, or Unicode. Moreover, the data 216 can include information sufficient to identify relevant information, such as numbers, descriptive text, proprietary codes, pointers, references to data stored in other memories, including other network locations, or information that is used by a function to calculate relevant data.

The client computing device 204 can also be configured similarly to the server computing device 202, with one or more processors 220, memory 222, instructions 224, and data 226. The client computing device 204 can also include a user input 228 and a user output 230. The user input 228 can include any appropriate mechanism or technique for receiving input from a user, such as keyboard, mouse, mechanical actuators, soft actuators, touchscreens, microphones, and sensors.

The server computing device 202 can be configured to transmit data to the client computing device 204, and the client computing device 204 can be configured to display at least a portion of the received data on a display implemented as part of the user output 230. The user output 230 can also be used for displaying an interface between the client computing device 204 and the server computing device 202. The user output 230 can alternatively or additionally include one or more speakers, transducers or other audio outputs, a haptic interface or other tactile feedback that provides non-visual and non-audible information to the platform user of the client computing device 204.

Although FIG. 2 illustrates the processors 210, 220 and the memories 212, 222 as being within the computing devices 202, 204, components described herein can include multiple processors and memories that can operate in different physical locations and not within the same computing device. For example, some of the instructions 214, 224 and the data 216, 226 can be stored on a removable SD card and others within a read-only computer chip. Some or all of the instructions and data can be stored in a location physically remote from, yet still accessible by, the processors 210, 220. Similarly, the processors 210, 220 can include a collection of processors that can perform concurrent and/or sequential operation. The computing devices 202, 204 can each include one or more internal clocks providing timing information, which can be used for time measurement for operations and programs run by the computing devices 202, 204.

The server computing device 202 can be configured to receive requests to process data from the client computing device 204. For example, the environment 200 can be part of a computing platform configured to provide a variety of services to users, through various user interfaces and/or application programming interfaces (APIs) exposing the platform services. The variety of services can include technique for automatic SSD recovery. The client computing device 204 can transmit input data associated with restart in place for virtual machines, a configurable timeout for SSD recovery attempts, and/or automatic snapshotting of SSD storage contents. The server computing device 202 can receive the input data, and in response, generate output data including instructions associated with the restart in place, configurable timeout, and/or automatic snapshotting.

The devices 202, 204 can be capable of direct and indirect communication over the network 208. For example, using a network socket, the client computing device 204 can connect to a service operating in a data center through an Internet protocol. The devices 202, 204 can set up listening sockets that may accept an initiating connection for sending and receiving information. The network 208 itself can include various configurations and protocols including the Internet, World Wide Web, intranets, virtual private networks, wide area networks, local networks, and private networks using communication protocols proprietary to one or more companies. The network 208 can support a variety of short- and long-range connections. The short- and long-range connections may be made over different bandwidths, such as 2.402 GHz to 2.480 GHz, commonly associated with the Bluetooth® standard, 2.4 GHz and 5 GHz, commonly associated with the Wi-Fi® communication protocol; or with a variety of communication standards, such as the LTER standard for wireless broadband communication. The network 208, in addition or alternatively, can also support wired connections between the devices 202, 204, including over various types of Ethernet connection.

Although a single server computing device 202, client computing device 204, and storage medium 206 are shown in FIG. 2, it is understood that the aspects of the disclosure can be implemented according to a variety of different configurations and quantities of computing devices, including in paradigms for sequential or parallel processing, or over a distributed network of multiple devices.

FIG. 3 depicts a flow diagram of an example process 300 for implementing restart in place for one or more virtual machines. The example process 300 can be performed on a system of one or more processors in one or more locations, such as the automatic SSD recovery system 100 of FIG. 1.

As shown in block 310, the restart in place engine 106 can receive data associated with restart in place. The data can include data associated with user selection of a restart in place mode to indicate a user would like the restart in place configuration applied to a physical machine with SSD storage. The data can further include metadata to match a virtual machine with the physical machine on which the virtual machine is being hosted. For example, the metadata can include a number of SSD disks on the physical machine and identifiers for each SSD disk. As another example, the metadata can include IP addresses or instance identifiers for the virtual machine.

As shown in block 320, the restart in place engine 106 can store the metadata associating the virtual machine with the physical machine. The metadata can be stored in any storage medium, which can be a combination of volatile and non-volatile memory and can be at the same or different physical locations than the restart in place engine 106.

As shown in block 330, the restart in place engine 106 can pause or shut down the virtual machine for maintenance. The restart in place engine 106 can also prevent other virtual machines from being scheduled on the same physical machine to ensure the physical machine is not overbooked. The maintenance can include planned maintenance, such as scheduled updates, or unplanned maintenance, such as host crashes. If planned maintenance, notifications can be provided to a user in advance that the virtual machine will be paused or shut down to allow the user to drain their applications. Planned maintenance can also be triggered by a user, such as through an API, to start the maintenance immediately.

As shown in block 340, maintenance can be performed on the virtual machine. The restart in place engine 106 or another engine like a maintenance engine (not shown) can perform the maintenance, such as providing an update to the virtual machine. For example, the restart in place engine 106 or another engine can update a kernel or operating system on the physical machine or update virtualization software that enables the virtual machine to run.

As shown in block 350, after maintenance is complete, the restart in place engine 106 can restart the virtual machine on the same physical machine based on the metadata. For example, the restart in place engine 106 can match identi-fiers of SSD disks with instance identifiers for the virtual machine. The restart in place engine 106 can also match other identifiers associated with the virtual machine, such as a name or networking setup. The identifiers for the virtual machine can be internal, unique identifiers. The identifiers of the SSD disks can include an index of local SSD, PCI topology, and/or SSD name. Notifications can be provided to a user that maintenance is complete to allow the user to rehydrate their application as needed. Since the same physical machine include the same local SSD storage, contents of the virtual machine can be preserved, providing consistency across virtual machine restarts.

FIG. 4 depicts a flow diagram of an example process 400 for implementing a configurable SSD recovery timeout for one or more virtual machines. The example process 400 can be performed on a system of one or more processors in one or more locations, such as the automatic SSD recovery system 100 of FIG. 1.

As shown in block 410, the timeout engine 108 can receive data associated with the configurable timeout. The data can include data associated with user selection of a configurable timeout to indicate a user would like the configurable timeout applied to SSD storage recovery. The data can further include a threshold associated with a maximum amount of time to attempt local SSD recovery for planned or unplanned maintenance. For example, the maximum amount of time can range from 0 to multiple hours or days and can differ if the maintenance is planned or unplanned. "0" can indicate no local SSD recovery should be attempted.

As shown in block 420, the timeout engine 108 can pause or shut down the virtual machine for maintenance. The timeout engine 108 can also prevent other virtual machines from being scheduled on the same physical machine to ensure the physical machine is not overbooked.

As shown in block 430, maintenance can be performed on the virtual machine, and, as shown in block 440, local SSD recovery can be performed for the virtual machine. While shown as separate blocks, performing maintenance on the virtual machine can also include performing local SSD recovery. The timeout engine 108 or another engine like a maintenance engine (not shown) can perform the maintenance and/or local SSD recovery. Local SSD recovery can be performed by confirming data on the physical machine is not corrupted and then allowing the virtual machine to access the data if not corrupted. As shown in block 450, the timeout engine 108 can monitor the amount of time that the local SSD recovery is taking to determine whether the local SSD recovery exceeds the threshold.

As shown in block 460, the timeout engine 108 can send instructions to stop or stop the local SSD recovery if the local SSD recovery exceeds the threshold amount of time. The virtual machine can be restarted on a different physical machine, which may not have access to the data on the local SSD to the previous physical machine that was hosting the virtual machine. If the threshold is 0, the timeout engine 108 can send instructions to immediately restart the virtual machine on a different physical machine, without attempting local SSD recovery or monitoring the amount of time the local SSD recovery is taking.

FIG. 5 depicts a flow diagram of an example process 500 for implementing automatic snapshotting for contents of one or more virtual machines. The example process 500 can be performed on a system of one or more processors in one or more locations, such as the automatic SSD recovery system 100 of FIG. 1.

As shown in block 510, the snapshot engine 110 can receive data associated with the automatic snapshotting. The data can include data associated with user selection of a automatic snapshotting to indicate a user would like the automatic snapshot configuration applied to a physical machine with SSD storage. The data can further include one or more trigger thresholds associated with impact on the virtual machine to trigger the snapshots. The trigger thresholds can include application level thresholds that infrastructure for the virtual machine must meet, such as input/output operations slowing down below a threshold or transaction rates for data copy/import/export meeting a threshold. The trigger threshold can also include indications that a virtual machine is about to terminate, such as a notification that maintenance is scheduled to occur. The data can also include whether the snapshot can be stored in persistent storage or archived in cold storage.

As shown in block 520, the snapshot engine 110 can monitor aspects of the one or more trigger thresholds to determine whether a threshold is met. For example, the snapshot engine 110 can monitor the speed of input/output operations and/or rates of transactions for data for the virtual machine. The snapshot engine 110 can further monitor for signals that a virtual machine is about to terminate.

As shown in block 530, the snapshot engine 110 can automatically snapshot contents of the local SSD if one or more trigger thresholds are met. The virtual machine can continue running and serving traffic or the virtual machine can be removed from the serving pool during the snapshot process due to potential application impact.

As shown in block 540, the snapshot engine 110 can send the snapshot to persistent storage, such as a persistent disk, or cold storage, such as less frequently used storage. Less frequently used storage can include any storage that can be externalized, such as hard disk drives (HDDs) or external SSDs. The snapshot engine 110 can further determine whether it is possible to archive the snapshot in cold storage, such as via a maximum amount of time a snapshot can take and/or a maximum size of the snapshot. If the time and/or size is exceeded, the snapshot engine 110 can send instructions to compress or compress the snapshot, or can distribute the snapshot to other cloud regions.

As shown in block 550, the snapshot engine 110 can export the snapshot back if the snapshot was sent to persistent storage. For example, the snapshot engine 110 can export the snapshot after a predetermined period of time or when the one or more trigger thresholds are no longer being met. The snapshot engine 110 can export the snapshot back to the same local SSD or a different local SSD for future virtual machines.

Figure 6:
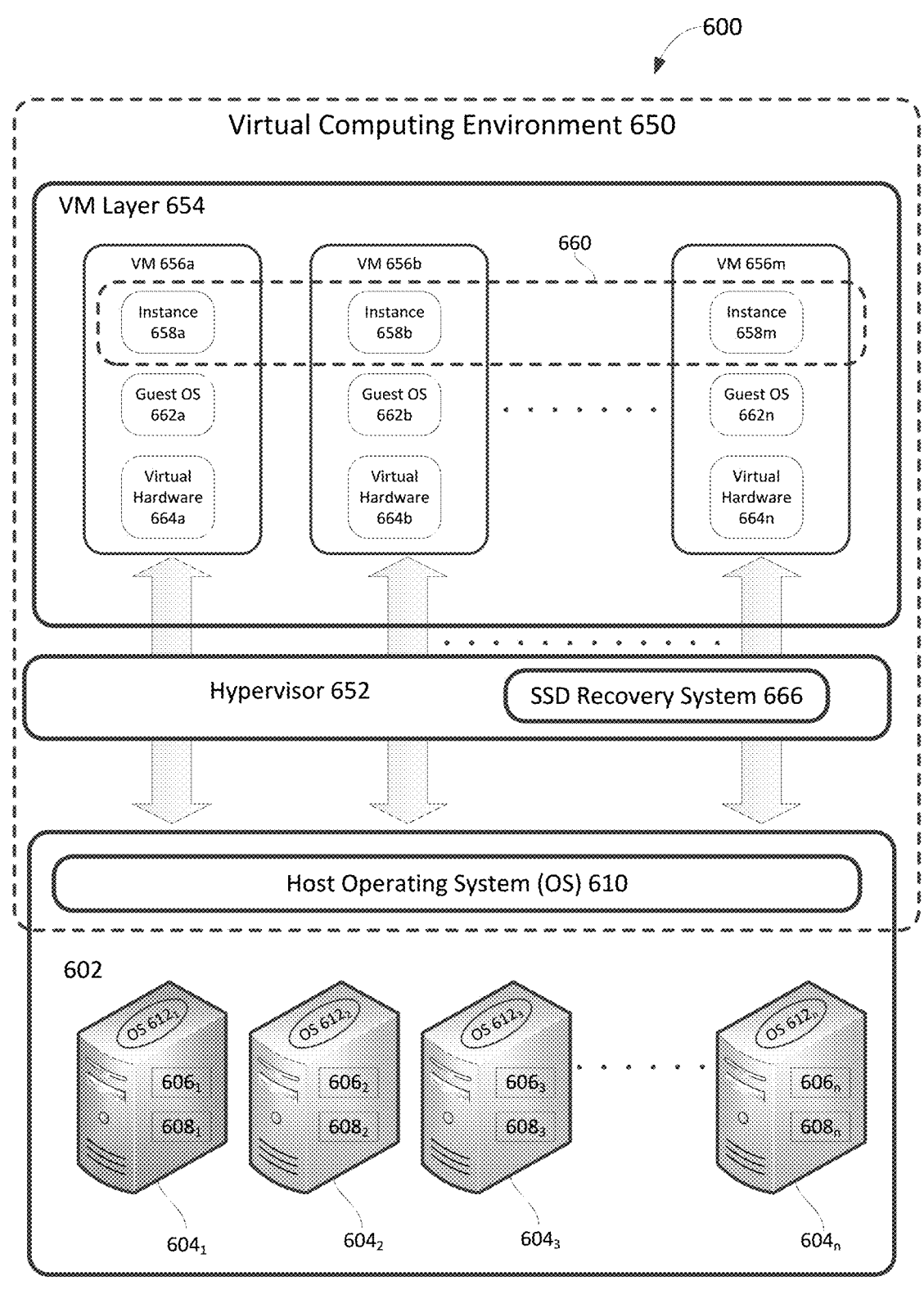
FIG. 6 depicts a block diagram of an example cloud-based platform to implement an SSD recovery system according to aspects of the disclosure.

FIG. 6 depicts a block diagram of an example cloud-based platform 600 to implement an SSD recovery system, such as the SSD recovery system 100 of FIG. 1. The platform 600 can include a collection 602 of host or physical machines 604, e.g., hardware resources, supporting or executing a virtual computing environment 650. The virtual computing environment 650 can include a virtual machine manager or hypervisor 652 and a virtual machine layer 654 running one or more virtual machines 656 configured to execute instances 658 of one or more applications 660.

Each physical machine 604 can include one or more physical processors 606, e.g., data processing hardware, and associated physical memory 608, e.g., memory hardware. While each physical machine 604 is shown having a single physical processor 606, the physical machines 604 can include multiple physical processors 606. The physical machines 604 can also include physical memory 608, which may be partitioned by a host operating system (OS) 610 into virtual memory and assigned for use by the virtual machines 656, the hypervisor 652, or the host OS 610. Physical memory 608 can include random access memory (RAM) and/or disk storage, such as SSD storage.

The host OS 610 can execute on a given one of the physical machines 604 or can be configured to operate across a plurality of the 6ost machines 604. Further, while the host OS 610 is illustrated as being part of the virtual computing environment 650, each physical machine 604 can be equipped with its own OS 612. The OS 612 on each physical machine 604 can be managed as a collective OS 610 to the hypervisor 652 and the virtual machine layer 654.

The hypervisor 652 can correspond to a compute engine that includes at least one of software, firmware, or hardware configured to create, instantiate/deploy, and execute the virtual machines 656. The hypervisor 652 can include an automatic SSD recovery system 666. The automatic SSD recovery system 666 can correspond to the automatic SSD recovery system 100 of FIG. 1. While shown as part of the hypervisor 652 in FIG. 6, in other implementations, the automatic SSD recovery system 666 can be part of the VM layer 654.

Each virtual machine 656 can be referred to as a guest machine. The hypervisor 652 can be configured to provide each virtual machine 656 with a corresponding guest OS 662 having a virtual operating platform and to manage execution of the corresponding guest OS 662 on the virtual machine 656. In some examples, multiple virtual machines 656 with a variety of guest OSs 662 can share virtualized resources. For example, virtual machines of different operating systems can all run on a single physical host machine.

The host OS 610 can virtualize underlying host machine hardware and manage concurrent execution of a guest OS 662 on the one or more virtual machines 656. For example, the host OS 610 can manage the virtual machines 656 to include a simulated version of the underlying host machine hardware or a different computer architecture. The simulated version of the hardware associated with each virtual machine 656 can be referred to as virtual hardware 664.

The virtual hardware 664 can include one or more virtual processors, such as virtual central processing units (vCPUs), emulating one or more physical processors 606 of a physical machine 604. The virtual processors can be interchangeably referred to as a computing resource associated with the virtual machine 656. The computing resource can include a target computing resource level required for executing the corresponding individual service instance 658 of the application 660.

The virtual hardware 664 can further include virtual memory in communication with the virtual processor and storing guest instructions executable by the virtual processor for performing operations. The virtual memory can be interchangeably referred to as a memory resource associated with the virtual machine 656. The memory resource can include a target memory resource level required for executing the corresponding individual service instance 658.

The virtual hardware 664 can also include at least one virtual storage device that provides run time capacity for the service on the host machine 604. The at least one virtual storage device may be referred to as a storage resource associated with the virtual machine 656. The storage resource may include a target storage resource level required for executing the corresponding individual service instance 658.

The virtual processor can execute instructions from the virtual memory that cause the virtual processor to execute a corresponding individual service instance 658 of the software application 660. The individual service instance 658 can be referred to as a guest instance that cannot determine if it is being executed by the virtual hardware 664 or the physical machine 604. The processors 606 of the host machine 604 can enable the virtual hardware 664 to execute software instances 658 of the application 660 efficiently by allowing guest software instructions to be executed directly on the processor 606 of the host machine 604 without requiring code-rewriting, recompilation, or instruction emulation.

The guest OS 662 executing on each virtual machine 656 can include software that controls the execution of the corresponding individual service instance 658 of the application 660 by the virtual machines 656. The guest OS executing on a virtual machine can be the same or different as other guest OSs executing on other virtual machines. The guest OS 662 executing on each virtual machine 656 can further assign network boundaries, e.g., allocate network addresses, through which respective guest software can communicate with other processes reachable through infrastructure, such as an internal network. The network boundaries may be referred to as a network resource associated with the virtual machine 656.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

The phrase "configured to" is used in different contexts related to computer systems, hardware, or part of a computer program. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program is said to be configured to perform one or more operations, this means that the computer program includes one or more program instructions, that when executed by one or more computers, causes the one or more computers to perform the one or more operations.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for controlling recovery of local solid state drive (SSD) storage comprising:

storing, by one or more processors, metadata indicating a physical machine that is hosting a virtual machine, the physical machine comprising local SSD storage, the metadata comprising a first identifier identifying the virtual machine and a second identifier identifying the local SSD storage, the first identifier being associated with the second identifier;

shutting down, by the one or more processors, the virtual machine for maintenance;

configuring, by the one or more processors, prevention of other virtual machines from being scheduled on the physical machine during the maintenance; and restarting, by the one or more processors, the virtual machine on the same physical machine comprising the local SSD storage based on the metadata after the maintenance is performed by determining the first identifier corresponds to the second identifier.

2. The method of claim 1, further comprising preserving, by the one or more processors, contents of the virtual machine on the local SSD storage based on restarting the virtual machine on the same physical machine.

3. The method of claim 1, further comprising performing, by the one or more processors, the maintenance on the virtual machine.

4. The method of claim 1, further comprising:

monitoring, by the one or more processors, an amount of time for a recovery process attempting to recover the local SSD storage;

determining, by the one or more processors, the amount of time has exceeded a predetermined maximum amount of time for attempting to recover the local SSD storage; and sending, by the one or more processors, instructions to stop the recovery process.

5. The method of claim 1, further comprising:

monitoring, by the one or more processors, impact on the virtual machine with respect to one or more trigger thresholds;

determining, by the one or more processors, one or more of the trigger thresholds is met;

snapshotting, by the one or more processors, contents of the local SSD storage to generate a snapshot; and sending, by the one or more processors, the snapshot to persistent storage.

6. The method of claim 5, wherein the one or more trigger thresholds comprise one or more of a speed of input or output operations slowing down below a threshold or rates for data copy, import, or export slowing down below a threshold.

7. The method of claim 5, further comprising exporting, by the one or more processors, the snapshot from the persistent storage to the local SSD storage or a different local SSD storage.

8. The method of claim 1, further comprising:

monitoring, by the one or more processors, impact on the virtual machine with respect to one or more trigger thresholds;

determining, by the one or more processors, one or more of the trigger thresholds is met;

snapshotting, by the one or more processors, contents of the local SSD storage to generate a snapshot; and archiving, by the one or more processors, the snapshot to cold storage.

9. A system comprising:

one or more processors; and one or more storage devices coupled to the one or more processors and storing instructions that, when executed by the one or more processors, cause the one or more processors to perform operations for controlling recovery of local solid state drive (SSD) storage, the operations comprising:

storing metadata indicating a physical machine that is hosting a virtual machine, the physical machine comprising local SSD storage, the metadata comprising a first identifier identifying the virtual machine and a second identifier identifying the local SSD storage, the first identifier being associated with the second identifier;

shutting down the virtual machine for maintenance;

configuring prevention of other virtual machines from being scheduled on the physical machine during the maintenance; and restarting the virtual machine on the same physical machine comprising the local SSD storage based on the metadata after the maintenance is performed by determining the first identifier corresponds to the second identifier.

10. The system of claim 9, wherein the operations further comprise:

monitoring an amount of time for a recovery process attempting to recover the local SSD storage;

determining the amount of time has exceeded a predetermined maximum amount of time for attempting to recover the local SSD storage; and sending instructions to stop the recovery process.

11. The system of claim 9, wherein the operations further comprise:

monitoring impact on the virtual machine with respect to one or more trigger thresholds;

determining one or more of the trigger thresholds is met;

snapshotting contents of the local SSD storage to generate a snapshot; and sending the snapshot to persistent storage.

12. The system of claim 11, wherein the operations further comprise exporting the snapshot from the persistent storage to the local SSD storage or a different local SSD storage.

13. The system of claim 9, wherein the operations further comprise:

monitoring impact on the virtual machine with respect to one or more trigger thresholds;

determining one or more of the trigger thresholds is met;

snapshotting contents of the local SSD storage to generate a snapshot; and archiving the snapshot to cold storage.

14. A non-transitory computer readable medium for storing instructions that, when executed by one or more processors, cause the one or more processors to perform operations for controlling recovery of local solid state drive (SSD) storage, the operations comprising:

storing metadata indicating a physical machine that is hosting a virtual machine, the physical machine comprising local SSD storage, the metadata comprising a first identifier identifying the virtual machine and a second identifier identifying the local SSD storage, the first identifier being associated with the second identifier;

shutting down the virtual machine for maintenance;

configuring prevention of other virtual machines from being scheduled on the physical machine during the maintenance; and restarting the virtual machine on the same physical machine comprising the local SSD storage based on the metadata after the maintenance is performed by determining the first identifier corresponds to the second identifier.

15. The non-transitory computer readable medium of claim 14, wherein the operations further comprise:

monitoring an amount of time for a recovery process attempting to recover the local SSD storage;

determining the amount of time has exceeded a predetermined maximum amount of time for attempting to recover the local SSD storage; and sending instructions to stop the recovery process.

16. The non-transitory computer readable medium of claim 14, wherein the operations further comprise:

monitoring impact on the virtual machine with respect to one or more trigger thresholds;

determining one or more of the trigger thresholds is met;

snapshotting contents of the local SSD storage to generate a snapshot;

sending the snapshot to persistent storage; and exporting back the snapshot to the local SSD storage or a different local SSD storage.

17. The non-transitory computer readable medium of claim 14, wherein the operations further comprise:

monitoring impact on the virtual machine with respect to one or more trigger thresholds;

determining one or more of the trigger thresholds is met;

snapshotting contents of the local SSD storage to generate a snapshot; and archiving the snapshot to cold storage.

* * * * *